UNITED STATES PATENT OFFICE.

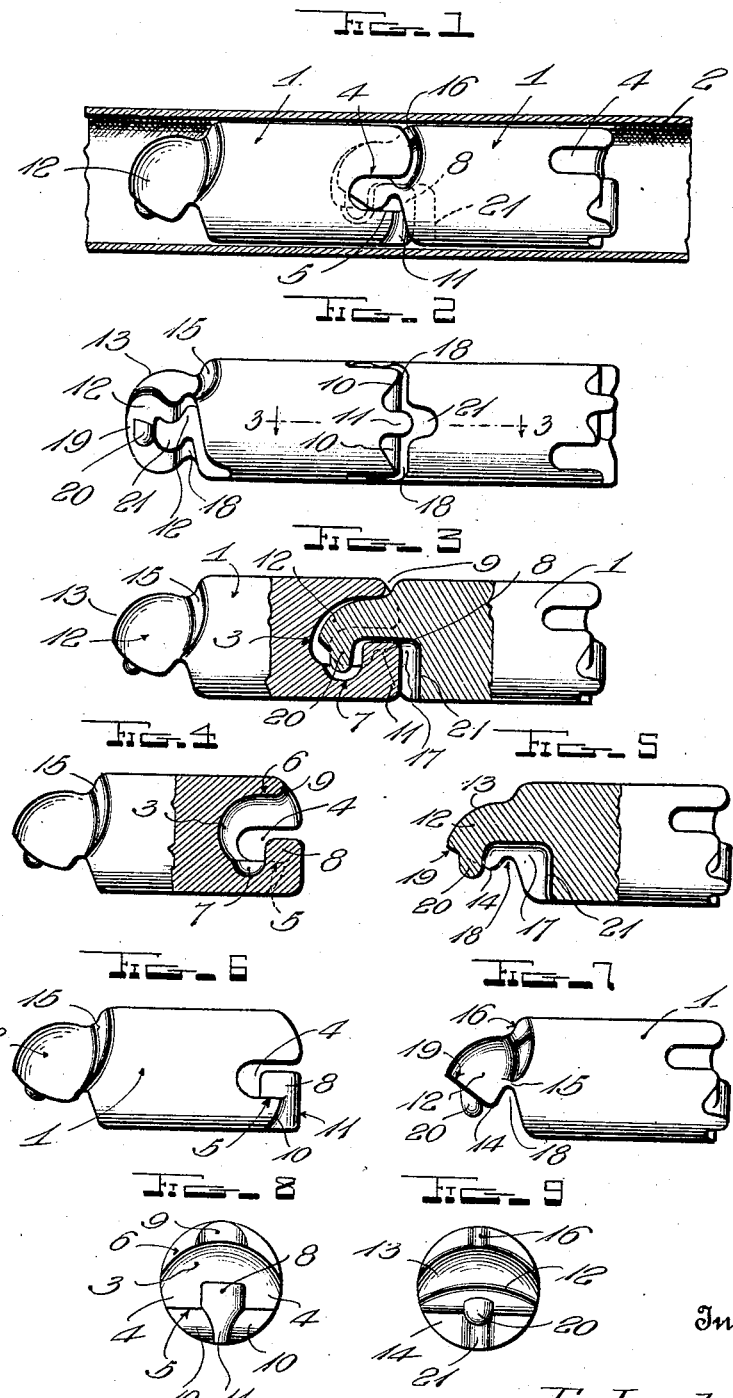

EDWARD LEEBERG, OF ROSELLE, NEW JERSEY.

FLEXIBLE SHAFT.

1,309,073.   Specification of Letters Patent.   Patented July 8, 1919.

Application filed July 9, 1918. Serial No. 244,108.

*To all whom it may concern:*

Be it known that I, EDWARD LEEBERG, a citizen of the United States, residing at Roselle, in the county of Union and State of New Jersey, have invented certain new and useful Improvements in Flexible Shafts, and I do declare the following to be a full, clear, and exact description of the invention, such as will enable others skilled in the art to which it appertains to make and use the same.

My invention has for its object to provide a simple and durable flexible shaft for dentists' drills, speedometers and the like, having an improved joint between the several links of such design as to permit quick and easy assembling or disassembling and to wear a great length of time.

With the foregoing object in view, the invention resides in the novel construction hereinafter fully described and claimed, and shown in the accompanying drawing.

Figure 1 is a side elevation of a portion of the shaft with the tubular casing in section.

Fig. 2 is a view similar to Fig. 1, but taken at right angles thereto.

Fig. 3 is a side elevation with parts in section on the plane of the line 3—3 of Fig. 2.

Fig. 4 is a side elevation of one link of the shaft with the socket end thereof in section.

Fig. 5 is a similar view of the next adjacent link showing the head end of the latter in section.

Figs. 6 and 7 are side elevations of two adjacent links separated from each other.

Fig. 8 is an end elevation of the socket end of one link.

Fig. 9 is a similar view of the head end of one of the links.

In the drawing above briefly described, the numerals 1 designate the cylindrical links of which the shaft is constructed and 2 has reference to the usual flexible tubular casing in which said links are housed. Since the construction of all of the links is the same (except possibly the endmost), only one will be described in detail.

One end of the link is provided with a socket 3 opening through opposite sides of the link at 4 and provided at opposite sides of these openings with a substantially flat side 5 and a curved or concave side 6, said flat side having a recess 7. The flat side 5 of the socket 3 is provided between the recess 7 and the end of the link with a preferably cylindrical lug 8 extending toward the curved side 6 for a suitable distance and directly opposite said lug, the end of the link is provided with a notch 9. Adjacent the base of the lug 8, the end of the link is preferably rounded as seen at 10, but a projecting rib 11 remains to reinforce the flat side of the socket 3 against the weakening effect of such rounding and the formation of the recess 7.

The end of the link 1 opposite the socket 3 is provided with a substantially quarter-spherical head 12 having a convex side 13 and an angular side 14 diverging inwardly therewith. The juncture of the head 12 with the link 1 is effected by a neck 15 and in order to reinforce this neck, a longitudinal rib 16 preferably extends across the same from the body of the link to the convex side 13 of the head. The side 14 of head 12 is provided with a recess 17 and with transverse grooves 18 leading from said recess to the sides of the head. The part of the side 14 between the recess 17 and the outer end of the head is beveled as at 19 and provided with a projecting lug 20. Directly opposite this lug the end of the link is formed with a groove 21 leading from the periphery of said link to the recess 17.

The head 12 of each link is received in the socket 3 of the next adjacent link, it being necessary to locate the two links at a suitable angle in order that the head may be inserted in the socket. When the links are brought into substantial alinement, however, the lug 20 is loosely received in the recess 7 and lug 8 similarly projects into the recess 17 as shown clearly in Fig. 3. The two lugs 8 and 20 then coöperate in preventing detachment of one link from the other until they are suitably angled. When this angling takes place, the rounded end 10 of one link is received in the transverse grooves 18 of the next adjacent link so as to permit the free rocking of the head in the socket without binding. When thus positioning the links, the rib 11 moves freely within groove 21 and thus interferes in no manner with the detachment or attachment of any two sections. Normally the rib 11 is disposed opposite and partly in the groove 21, and the reinforcing rib 16 is similarly associated with the groove 9.

The arrangement shown and described permits the free relative swinging of the several sections regardless of the manner in which the shaft is used. Whenever it is necessary, it is a simple matter to assemble or disassemble the entire shaft or any part thereof and in case of breakage of one link, such link may be removed and the next adjacent links joined to each other, since the joint shown and described permits considerable endwise play of the links, which play is ample to permit a broken link to be discarded as set forth.

Since probably the best results are obtained from the details shown and described, they are by preference followed, but within the scope of the invention as claimed, considerable latitude is allowed for making minor changes as occasion may dictate. For instance, although in practice the transverse axes of the several joints will preferably be spaced approximately 45° apart, to prevent all joints from having the same movement simultaneously, this arrangement may be varied, if found desirable.

I claim:

1. In a flexible shaft, an elongated link having a socket opening through one of its ends, one side of said socket being concave and the opposite side relatively flat, and a second elongated link having on one end a substantially quarter-spherical head received non-rotatably in said socket with its convex surface engaging the concave side of said socket, said head having turning movement in said socket allowing angling of the two links in all directions.

2. In a flexible shaft, an elongated link having a socket opening through one of its ends, one side of said socket being concave and the opposite side relatively flat, and a second elongated link having on one end a substantially quarter-spherical head received in said socket with its convex surface engaging the concave side of said socket, said head being shaped for contact with said relatively flat side of said socket to form a driving connection between the two links, said head having turning movement in said socket allowing angling of the two links in all directions.

3. A structure as specified in claim 1, said relatively flat side of the socket and the adjacent side of said head having a loosely interfitting lug and recess connection to prevent endwise separation until the links are angled to a predetermined extent.

4. In a flexible shaft, an elongated link having a longitudinal socket opening through one of its ends and opening also through opposed sides of said link, one side of said socket being concave transversely from one open side to the other, and the side of said socket opposite said concave side being relatively flat, said relatively flat side having near its outer end an inwardly extending lug and in rear of said lug a recess, and a second elongated link having on one end a substantially quarter-spherical head received in said socket with its convex side engaging said concave side of said socket, the side of said head opposite said convex side diverging inwardly with the latter and having a recess and a lug engaging said first named recess and lug, said head having opposed grooves leading from its recess through its sides to clear the end of the first named link when the two are angled for connecting or disconnecting them.

5. A structure as specified in claim 4, the adjacent ends of said links having radially disposed loosely interfitting ribs and grooves.

In testimony whereof I have hereunto set my hand.

EDWARD LEEBERG.

Copies of this patent may be obtained for five cents each, by addressing the "Commissioner of Patents, Washington, D. C."